UNITED STATES PATENT OFFICE.

HARLOW M. WILCOX, OF CHICAGO, ILLINOIS, ASSIGNOR OF ONE-HALF HIS RIGHT TO DELOS W. ELDRED, JOHN J. CHASE, A. B. WESCOTT, AND GEO. B. GRIFFIN, OF SAME PLACE.

IMPROVEMENT IN PROCESSES FOR THE MANUFACTURE OF ARTIFICIAL STONE.

Specification forming part of Letters Patent No. 131,382, dated September 17, 1872.

*To all whom it may concern:*

Be it known that I, HARLOW M. WILCOX, of the city of Chicago, in the county of Cook and State of Illinois, have invented a new and useful Process in the Manufacture of Artificial Stone; and I hereby declare the following to be a full, clear, and exact description thereof, which will enable others skilled in the art to use the same.

My invention relates to a process in the manufacture of artificial stone; and consists in submitting the ingredients used in the manufacture of artificial stone to the action of steam charged with chloride of calcium, steam charged with soda, and to the action of carbonic-acid gas at a high temperature and under pressure, as hereinafter more particularly described.

In my process for the manufacture of artificial stone I take from two to four parts of sand, according to the grain and quality thereof, and one part of hydraulic cement, preferably "Louisville" cement, and thoroughly mix the same, in a dry state, and then moisten the same with a solution of chloride of calcium in the proportion of about one ounce of chloride of calcium to one quart of water, and so as to moisten all parts of the mixture of sand and cement but not so moist as to bring water to the surface when tamping said mixture in molds. The mass or mixture thus prepared is tamped into molds of any desired form and dimensions, after which the molds are removed and the form or stone is allowed to stand until the cement is partly set, and until it can be moved without danger of breaking, and is then placed within an air and steam tight vat, cylinder, vessel, or receptacle capable of bearing a pressure of about forty pounds to the square inch, and which said vat or receptacle is suitably constructed to admit of the introduction of steam, gas, or hot air under pressure. In connection with said vat, cylinder, or vessel I use a vessel of suitable material and construction to contain chloride of calcium, and so that steam may pass therein and therefrom, charged with the chloride of calcium, and into the vat or cylinder aforesaid. I also use a similar vessel in which soda is placed, and for a similar purpose. I also use another and similar vessel in which carbonic-acid gas is generated and passes therefrom into the vat or cylinder, as aforesaid. I then inject into the said vat, cylinder, or other receptacle containing the mixture or stone aforesaid separately, but simultaneously, and under the same degree of pressure, as near as can be, the steam charged with chloride of calcium, the steam charged with soda and the carbonic-acid gas, their united action, under a high temperature and pressure as aforesaid, producing a new gaseous compound, which I am unable at this time to name or classify, which comes in direct contact, permeates, and unites with the mixture or stone aforesaid, and by the united action of said gaseous compound with the cement renders insoluble all the ingredients of the cement and adds new substances thereto and so that the weight and solidity thereof are increased. This mixture or stone is allowed to remain in the vat, vessel, or chamber under a temperature of about 230° Fahrenheit and under a pressure of about twenty pounds to the square inch in connection with and under the influence and effects of the volatile substances aforesaid or the new gaseous compound formed therefrom from one to six hours, according to the dimensions of the stone being manufactured or hardened, and is then allowed to cool gradually to about 100° Fahrenheit, when it is removed, thoroughly dried, and is then fit for use.

I am aware that a free solution of the chloride of calcium has heretofore been used in the manufacture of artificial stone; and also that carbonic-acid gas has been used free for the purpose of setting and hardening hydraulic cements and artificial stone, especially when lime is used as a base, as has been generally practiced for hardening the plastering of buildings.

By my process as above described the setting power of the cement is greatly increased, and the volatile substances, by the action of the heat and pressure when brought in contact with the mixture or stone previously moistened with the chloride of calcium, are united together, and with the mixture or stone, and so that the same and the component parts of the cement are rendered insoluble and prevented from escaping, whereby I am enabled to manufacture a better and more durable artificial stone in less time and with less expense than is now made.

Having thus described my invention, what I claim as new, and desire to secure by Letters Patent, is—

1. The process of hardening artificial stone by the action of steam charged with the chloride of calcium, steam charged with soda, and carbonic-acid gas at a high temperature and under pressure, substantially specified.

2. The manufacture of artificial stone by mixing sand with hydraulic cement moistened with a solution of chloride of calcium and subjecting the same to the action of steam charged with chloride of calcium, steam charged with soda and carbonic-acid gas at a high temperature and under pressure, substantially as specified.

HARLOW M. WILCOX.

Witnesses:
N. C. GRIDLEY,
F. F. WARNER.